United States Patent [19]

Boisvert et al.

[11] Patent Number: 5,235,412
[45] Date of Patent: Aug. 10, 1993

[54] ELECTRONIC COLOR IMAGING SYSTEM AND ANALOG SIGNAL PROCESSOR THEREFOR

[75] Inventors: David M. Boisvert; Charles V. Stancampiano, both of Rochester, N.Y.

[73] Assignee: Eastman Kodak Company, Rochester, N.Y.

[21] Appl. No.: 930,137

[22] Filed: Aug. 17, 1992

[51] Int. Cl.$^5$ .......................... H04N 9/67; H04N 5/52
[52] U.S. Cl. ........................................ 358/30; 358/41; 358/171
[58] Field of Search ................... 353/171, 174, 41, 43, 353/44, 48, 213.11, 213.16, 213.23, 213.26, 30, 29 C; 307/353

[56] References Cited

U.S. PATENT DOCUMENTS

| | | | |
|---|---|---|---|
| 4,549,215 | 10/1985 | Levine | 358/213 |
| 4,862,286 | 8/1989 | Suda et al. | 358/213.16 X |
| 4,886,986 | 12/1989 | Watanabe | 307/353 |
| 4,987,321 | 1/1991 | Toohey | 307/520 |
| 5,010,408 | 4/1991 | Toohey | 358/213.11 |
| 5,047,863 | 9/1991 | Pape et al. | 358/213.16 |
| 5,105,276 | 4/1991 | Schrock | 358/171 X |

OTHER PUBLICATIONS

M. H. White et al., entitled "Characterization of Surface Channel CCD Image Arrays at Low Light Levels", *IEEE Journal of Solid-State Circuits,* vol. SC-9, No. 1, Feb. 1974, pp. 1-13.

*Primary Examiner*—Mark R. Powell
*Attorney, Agent, or Firm*—Stephen C. Kaufman

[57] ABSTRACT

There is disclosed an electronic imaging system employing a high efficiency CCD imaging unit and a plurality of unique analog signal processors (ASP's). The ASP's operate in unison for receiving a first color sequence, such as cyan (C), yellow (Y), and green (G), of color-component pixel image signals from the CCD unit and for providing respective output image signals of a second sequence of color components such as blue (B), red (R), and green (G), having proper white balance for combining into a high definition full color image. The dark background or zero level of the output image signals is referenced to a common "dark" reference voltage to minimize dark background variations in the combined color image. Each ASP is substantially identical and has a unique architecture which facilitates its implementation as an integrated circuit. The ASP has a dynamic range of substantially better than 8-bits and provides for a wide range of signal sample rates (e.g., 1 to 40 MHz). By employing masks of certain colors such as C, Y and G in the CCD unit itself higher efficiency and lower noise is obtained than by using colors such as R, G, and B.

13 Claims, 4 Drawing Sheets

ELECTRONIC COLOR IMAGING SYSTEM AND ANALOG SIGNAL PROCESSOR THEREFOR

CROSS REFERENCE TO RELATED PATENT APPLICATION

The present invention is related to a co-pending U.S. patent application, Ser. No. 931,245, which is being filed concurrently with the present patent application, is entitled "Improved Analog Signal Processor for Electronic Imaging Systems", has a common assignee with the present patent application, and has as its inventors, D. Boisvert, M. Gaboury and G. Moberg.

FIELD OF THE INVENTION

This invention relates to a an improved imaging system and an analog signal processor (ASP) therefor, utilizing, for example, cyan, yellow and green color-component pixel image signals from charge coupled devices (CCD's) and the like to provide high quality full color images with wide dynamic range and compatibility with high definition color television (HDTV) standards.

BACKGROUND OF THE INVENTION

Recent years have seen the rapid development of photo-sensing charge coupled devices (CCD's) for electronic imaging of a scene. Because of their many advantages (small size, low power, low cost, etc.), CCD's have become the imaging units of choice in many applications such as consumer camcorders. As the performance and quality of CCD's improves, they are being used more and more in various imaging systems requiring high resolution, full color balance, wide dynamic range, low-light sensitivity, and high frequency response such as required by high definition television (HDTV) or as needed in instruments used for astronomical observations where incident light levels are extremely low.

A CCD photo-imaging unit typically has horizontal rows and vertical columns arranged in an X and Y pattern of light-sensing cells within a given area onto which an image of a scene is optically focused. By way of example, there may be about a thousand or more such cells in each vertical column and a thousand or more cells in each horizontal row for a total of a million or more cells within an area which may be only one or a few square centimeters. Each cell represents a very small area, termed a pixel, of the total image; the more pixels present in the CCD unit, the higher the resolution in the image reproduced by the CCD. For prospective HDTV applications, about two million pixels per image area of a CCD are used, and the pixel signals are sampled and outputted from the unit as analog image signal voltages to a signal processor at about a 40 MHz rate. This is a much higher rate than is required, for example, in a present day color television system operating in accordance with the national television standards committee (NTSC) requirements and having only about one-quarter million pixels. This high speed of 40 MHz is difficult to achieve along with very low noise, good color balance, and linearity over a wide dynamic range.

There are certain characteristics of a CCD photo-imaging unit which must be compensated for by the electronic analog signal circuitry which receives and processes the video signals produced by the CCD unit in order to obtain a high quality image. The electrical signal stored at each cell of the CCD unit is related to the intensity of the light of an image at a given instant incident on the area of that particular cell. The individual cells are made very small (e.g., about 7 microns square) in order to obtain a large number of pixels per area (e.g., two million per area). As a consequence of the small size of each cell the electrical signal from each cell (representing an image pixel) is relatively small. Therefore noise, such as thermal noise and switching transients within the CCD unit, becomes a significant factor affecting the quality of an image reproduced by the unit.

An extensive discussion of CCD imaging units and some of the problems associated with them is given in an article by M. H. White, et al., entitled "Characterization of Surface Channel CCD Image Arrays at Low Light Levels", *IEEE Journal of Solid State Circuits*, vol. SC-9, No. 1, February 1974, pages 1-14. This article describes the theory and operation of a CCD imaging unit and describes a method termed correlated double sampling (CDS) "to remove switching transients, eliminate the Nyquist noise associated with the reset switch/node capacitance combination, and suppress '1/f' surface-state noise contributions of a CCD unit". A schematic diagram of a CDS signal processor employing the method of correlated double sampling is shown in FIG. 5, on page 4 of the White et al. article.

The dynamic range of an analog image signal is conveniently expressed as a binary bit number. Thus an 8-bit number (with a decimal equivalent of 256) expresses the ability of a circuit to divide (digitize) the signal accurately into 256 parts. This in turn implies that noise and distortion contribute less than one part in 256 parts (about ½ percent) of the total image signal. By way of example, consumer camcorders have a dynamic range of about 8-bits, whereas quality color film today has a dynamic range of roughly 12 to 14-bits (with a decimal equivalent of 4096 to 16,384). it is desirable therefore, in producing high quality electronic color images, such as desired for HDTV systems, to provide an analog signal processor (ASP) for the output of a CCD imaging unit having a dynamic range substantially greater than 8-bits.

The individual cells of a CCD unit are adapted by means of respective color masks (filters) applied over the cells to respond to individual color components of an image. In accordance with the NTSC standards for color television, the color components of a full color image are defined to be "red", "green" and "blue". In the past these red (R), green (G) and blue (B) color components were obtained directly from a CCD unit by covering certain cells of the unit with R masks, other cells with G masks, and still other cells with B masks.

By conventional definition, the color "cyan" (C) is "green" plus "blue" (G+B) and the color "yellow" (Y) is "green" plus "red" (G+R). It is known that for blue light a cyan color (C) mask (filter) has a substantially greater light transmittance than a blue (B) mask, and similarly a yellow color (Y) mask has a greater light transmittance for red light than a red (R) mask. Therefore, from the standpoint of higher electrical efficiency and lower noise, it is desirable that the cells of a CCD color imaging unit be covered with C, Y and G masks, rather than with R, G and B masks. With previous systems the difficulty and added complexity of converting C, Y, G image signals into R, G, B image signals has limited the use of CCD units which output C, Y and G color-component pixel image signals, even though such CCD units are superior in certain ways.

The "green" masked cells of a CCD color imaging unit generate (for a given "white" or balanced color image) different electrical output signals than do the "cyan" or the "yellow" cells. It is necessary therefore to compensate for these differences in the C, Y and G signal outputs in order to obtain a proper "white balance" in an electronically reproduced image. When the respective cells (e.g., C, Y and G) do not receive any light (total darkness), they in fact produce a small minimum "dark" signal voltage. The cells themselves are all the same (only the color masks are different) and the "dark" (no light) signals are substantially the same for all of the cells in a given horizontal row of a CCD unit. As will be explained in detail hereinafter, unless this "dark" signal characteristic of the C, Y and G cells is properly compensated for (along with white balancing of the respective colors) there will appear in a high resolution color image, such as in a HDTV system, visually objectionable "streaks" or variations in the "dark" background of the color image. The present invention also provides a highly effective answer to this problem of proper white balance and of reduction in dark background variations.

It is desirable to have an electronic imaging system, and an analog signal processor therefor, which are versatile in application and which provide:

1. System output of color-component image signals with one sequence of colors (i.e., color component group) derived from a CCD imaging unit which outputs color-component pixel image signals with a different sequence of colors for improved efficiency.

2. Operation over a wide range of signal sampling rates (e.g., 1 to 40 MHz).

3. Effective "white balance" of the component colors of a full color image along with minimal dark background variation.

4. Periodic "dark" pixel referencing (line rate clamping).

5. Dynamic range of 10-bits or better at slow sample rates and better than 8-bits at 40 MHz.

6. Improved clamp, sample and signal hold operation (modified "correlated double sampling") for more efficient utilization and higher signal to noise ratio (S/N) of the output signals of the CCD imaging unit.

7. Extremely stable and linear operation with efficient temperature compensation.

8. Ease of implementation as an integrated circuit.

9. Very small physical size.

10. Cost effectiveness.

SUMMARY OF THE INVENTION

In accordance with one aspect of the present invention, there is provided an improved electronic color imaging system. This system utilizes a more sensitive CCD imaging unit which produces color-component pixel image signals corresponding for example, to cyan (C), yellow (Y), and green (G) colors of an overall image. Each of these color component signals from the CCD unit is applied to a respective analog signal processor (ASP). The ASP's are operated in unison and in parallel with each other and produce color-component output image signals of red (R), green (G), and blue (B). These R, G, and B output signals are simply and efficiently derived by the ASP's directly from the C, Y, and G pixel image signals received by the respective ASP's from the CCD unit. Thus the S/N ratio of the system is improved. The gain of each ASP is set separately to achieve "white balance" when the color components (C, Y, and G) being separately processed by the respective ASP's are outputted as R, G, and B color-component image signals to be subsequently re-combined into a full color image. "Dark" level differences are eliminated even though the color components are amplified in different amounts by their respective ASP's to achieve white balance. Each ASP is advantageously an IC and the ones in this improved color system are substantially identical to each other and operate under identical conditions (though with separate control signals and individual gain and feedback settings). This arrangement greatly simplifies system design and reduces overall cost while at the same time giving more nearly perfect image reproduction.

In accordance with another aspect of the invention, an analog signal processor (ASP) such as described and claimed in the above-identified co-pending U.S. patent application, is uniquely modified to permit it to receive a respective color component signal (such as cyan or yellow) from a CCD imaging unit and to directly output a related color component signal (such as blue or red). The ASP's provided by the present invention thus greatly facilitate the use of CCD imaging units based on colors different from R, G, and B to obtain greater sensitivity and improved S/N ratio. At the same time these ASP's give as direct outputs color-component image signals of red, green and blue (with white balance) in order to be fully compatible with standard electronic color displays, HDTV systems, etc.

In accordance with still another aspect of the invention, there is provided an electronic color image system in which a photo-imaging unit provides a plurality of color-component pixel image signals in a first sequence of colors the electronic color image system outputting color-image output signals in a second sequence of colors. The system comprises a plurality of analog signal processors (ASP's) which are substantially identical and which are operated in unison, the ASP's being connected to receive a respective one of the color-component pixel image signals in the first sequence of colors and for processing them into a like plurality of amplified color-component output image signals in the second sequence of colors to be combined into a full color image with white balance and uniform dark background level. A first ASP of the plurality is connected to apply a first color-component output image signal from itself to a second ASP, the second ASP combining the first color component output image signal with a different color-component image signal being processed in the second ASP and outputting a second color-component output image signal, such that color-component pixel image signals in the first sequence of colors are directly outputted by the ASP's as color-component output image signals in the second sequence of colors.

In accordance with yet another aspect of the invention, there is provided an analog signal processor (ASP) for use with a CCD imaging unit in an electronic image system. The ASP has input means for receiving pixel image signals from the CCD unit and for clamping, sampling and holding sample values of the pixel signals for processing within the ASP. The ASP also has amplifier means having a first input for receiving the sample values of the pixel signals and for amplifying the signals with a selected gain at low noise over a wide bandwidth to obtain a first component of image signals, the amplifier means having a second input for receiving a second component of image signals and for combining the first and second components to obtain desired output image signals, the amplifier means having gain which is adjustable over a range and having a feedback input for setting a d.c. level of the output image signals at a desired dark zero value. The ASP further has feedback means for receiving output image signals and for feeding back to the feedback input of the amplifier means a compensating signal for setting the dark zero value of the output image signals independent of the gain setting of the amplifier means.

The invention will be better understood from a consideration of the following detailed description taken in conjunction with the accompanying drawings and claims.

DETAILED DESCRIPTION

Figure 1:
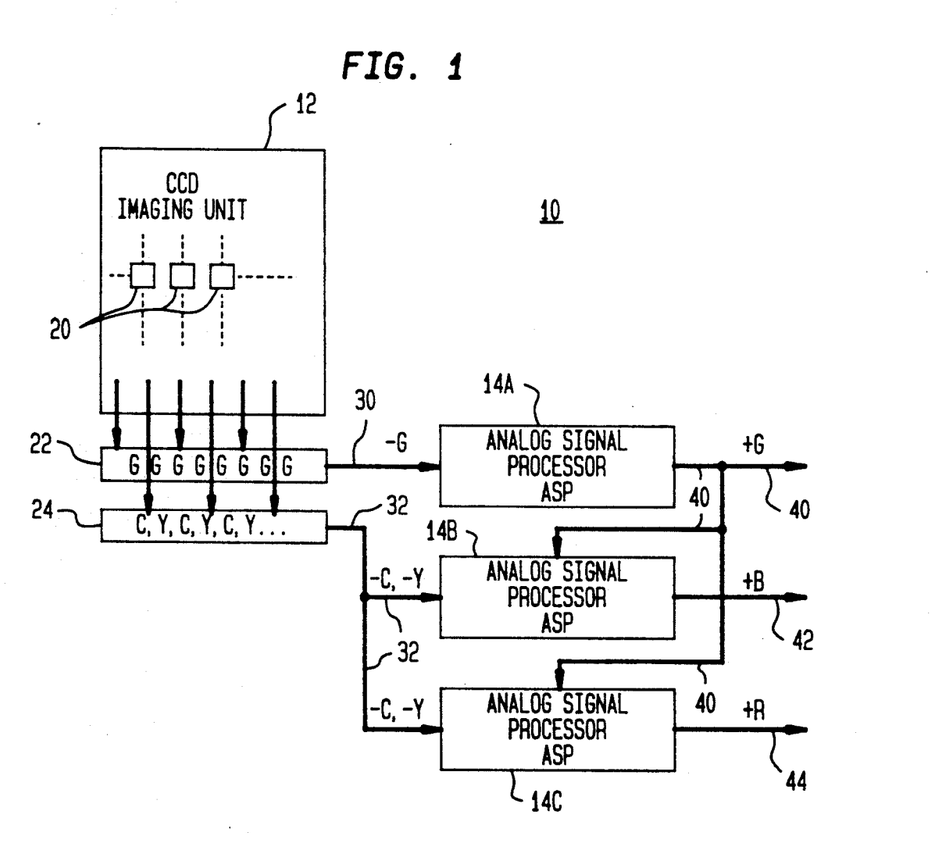
FIG. 1 is a schematic block diagram of an electronic color imaging system in accordance with the present invention.

Referring now to FIG. 1, there is shown an electronic color imaging system 10 in accordance with the present invention. The imaging system 10 comprises a CCD imaging unit 12, and a plurality of substantially identical analog signal processors (ASP's,—three of which are shown here as 14A, 14B, and 14C), and first and second horizontal shift registers 22 and 24. The CCD unit 12 is of a type well known in the art. It receives an image of a scene which is optically focused onto a multitude of very small photo-sensitive cells 20 (three of a common row of which are illustrated by way of example) arranged over an area in closely spaced rows and columns X and Y. Each cell 20 forms an individual pixel of the total image. Respective cells 20 are covered by separate C, Y, and G color masks (not shown) to provide respective color-component pixel image signals, as was explained previously. By way of example, the CCD unit 12 contains twice as many G cells 20 (cells covered by a G color mask) as C cells 20 (cells covered by a cyan mask) or Y cells 20 (cells covered by a yellow mask). In an arrangement well known in the art, a horizontal row of G cell 20 signals are transferred, during an interval termed "vertical to horizontal transfer", to a first horizontal signal register 22 of the CCD unit 12 where they are temporarily stored as a series of G pixel image signals. Similarly, a horizontal row of alternating C cells signals and Y cell signals are transferred to a second horizontal signal register 24 where they are stored as a series of C,Y,C,Y, etc. pixel image signals. During an interval termed "horizontal readout", the G pixel image signals are outputted one by one in negative polarity (−G) from the register 22 onto a lead 30 which is connected to an input of the ASP 14A. Similarly, the C, Y pixel image signals in the register 24 are outputted in sequence C,Y,C,Y, etc. in negative polarity onto a lead 32 which is connected to an input of the ASP 14B and to an input of the ASP 14C. As will be explained in detail hereinafter, the ASP's 14A, 14B, and 14C are substantially identical to each other. They are operated in unison and in parallel with each other and receive in common certain control signals and reference voltages (both not shown), and receive respective ones of certain other control signals (not shown). The ASP's 14A, 14B, and 14C are individually adjusted in their signal gain settings and "dark" zero level biases in order to achieve white balance and to eliminate "dark" background variations.

The operation of the ASP's 14A, 14B. and 14C will be described in detail hereinafter. Briefly stated, the ASP 14A samples, amplifies and inverts the G pixel image signals on the lead 30 and applies a positive going G color-component (+G) output signal to a lead 40. The lead 40 is connected to a specially provided input terminal (not shown here) of the ASP 14B, and to a specially provided input terminal of the ASP 14C, as will be described in detail hereinafter. The ASP 14B samples, amplifies and inverts only the C pixel image signals applied to it by the lead 32. The ASP 14B applies a positive going B color-component output signal (+B) to a lead 42. Similarly, the ASP 14C samples, amplifies, and inverts only the Y pixel image signals applied to it by the lead 32. The ASP 14C applies a positive going R color-component output signal (+R) to a lead 44. The leads 40, 42, and 44 can be connected to respective "green", "blue", and "red" signal inputs of a color display unit (not shown), as is well known in the art. The electronic imaging system 10 with its unique interconnections within and amongst the ASP's 14A, 14B, and 14C operates simply and efficiently. The system 10 receives one set of component colors (e.g., C, Y, and G) of pixel image signals from the CCD unit 12 and directly converts them into another set of component colors (e.g., R, G, and B) of output image signals which are immediately compatible with present color television standards, for example.

Figure 2:
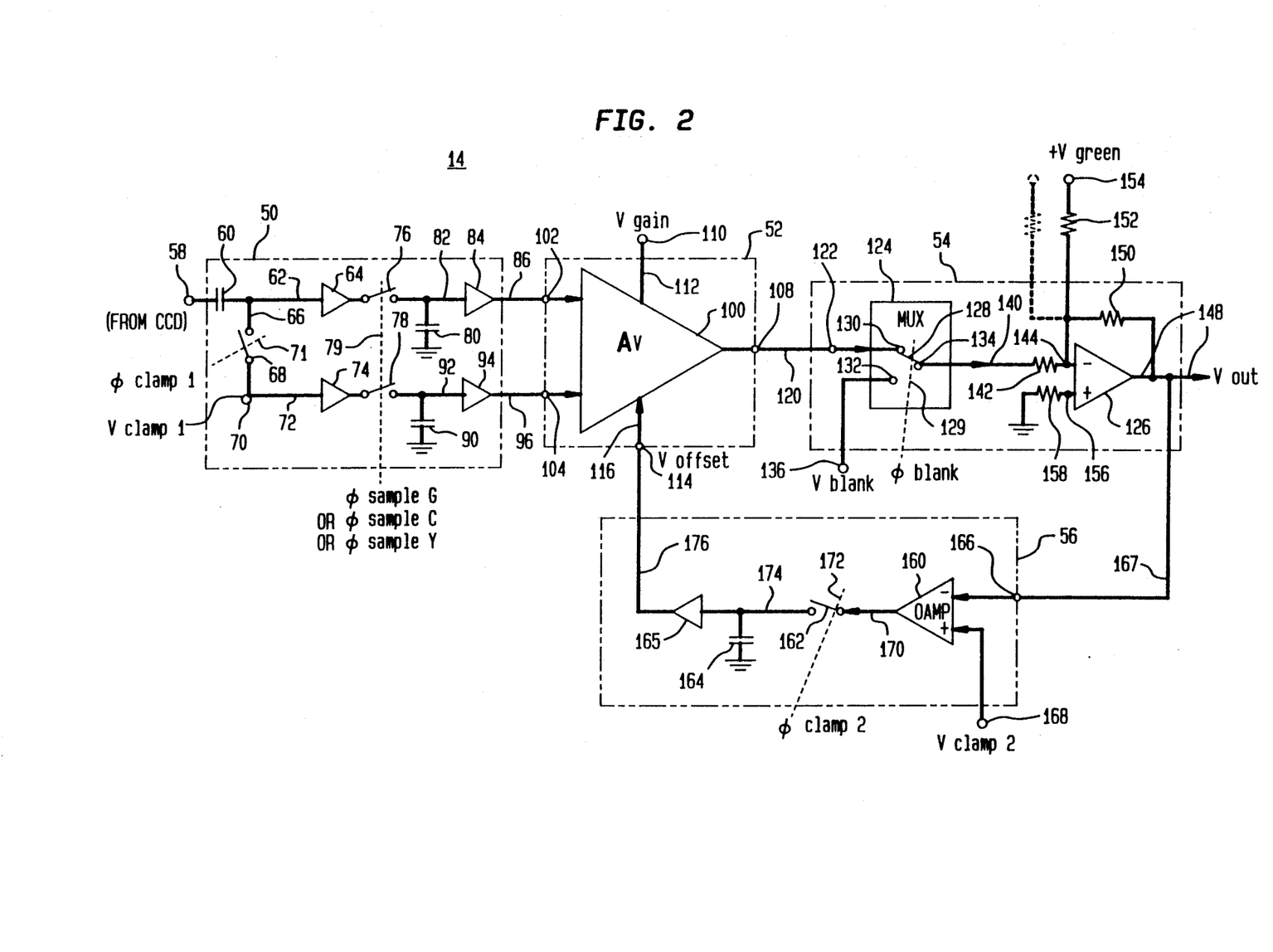
FIG. 2 is a illustrative schematic circuit diagram of an analog signal processor (ASP) of FIG. 1 in accordance with the present invention.

Referring now to FIG. 2, there is shown a circuit diagram of the ASP 14 which can serve as any one of the ASP's 14A, 14B, and 14C of FIG. 1. The ASP 14 comprises a first (input) section 50, a second (amplifier) section 52, a third (output) section 54 and a fourth (feedback) section 56. Each of these sections 50, 52, 54 and 56 is shown within a respective dashed line box. The first section 50 of the ASP 14 has an input terminal 58 which is adapted to receive a respective color component image signals (e.g., "−G" or "−C", "−Y") from the CCD unit 12 of FIG. 1. The input terminal 58 of the section 50 is connected to a first terminal of a coupling capacitor 60, a second terminal of which is connected via a lead 62 to an input of a buffer amplifier 64 and via a lead 66 to a first terminal of a clamping switch 68. A second terminal of the switch 68 is connected to a terminal 70 to which a reference voltage "V clamp 1" is applied and which is connected via a lead 72 to an input of a buffer amplifier 74. The switch 68 is activated by a control signal "φ clamp 1" as indicated by the dashed line 71 which intersects an input (control) of switch 68. The opening and closing of the switch 68 with relation to the input pixel image signals is described hereinafter. The buffer amplifiers 64 and 74, which are identical, comprise part of a differential circuit which improves low noise and wide range of operation of the ASP 14.

An output of the buffer amplifier 64 is connected to a first terminal of a switch 76 and a output of the buffer amplifier 74 is connected to a first terminal of a similar switch 78. Both switches 76 and 78 are actuated together as indicated by the dashed line 79 by a respective one (but only one) of control signals "φ sample G", or "φ sample C", or "φ sample Y". The timing of these control signals and the opening and closing of the switches 76 and 78 with relation to the input signals at terminal 58 of the ASP's 14A, 14B, and 14C is described hereinafter. Connected to a second terminal of the switch 76 is a first terminal of a capacitor 80 which has a second terminal which is grounded. The voltage level of charge stored on the capacitor 80 is applied via a lead 82 to an input of a buffer amplifier 84 which has an output which is applied to a lead 86. Similarly, a second terminal of the switch 78 is connected to a first terminal of a capacitor 90, a second terminal of which is grounded. The voltage level of the charge stored on the capacitor 90 is applied via a lead 92 to an input of the buffer amplifier 94 which has an output which is applied to a lead 96. The capacitors 80 and 90 are advantageously very small (e.g., 3 pF each) and identical to each other. The capacitance of capacitors 80 and 90 is selected in accordance with sample rate and can vary over a considerable range. Even at a high sample rate of 40 MHz of the pixel image signals from the CCD unit 12 applied to the terminal 58, the capacitor 80, being very small, quickly charges to full input signal level when the switch 76 is closed. The capacitor 80 (even though very small) holds its charge substantially at that level when the switch 76 is opened and until it is closed again about 25 nanoseconds later. During this time the capacitor 90 is charged to the level of the reference voltage "V clamp 1". Both capacitors 80 and 90, having identical time constants, will over time lose their respective charges (by leakage, etc.) at substantially the same rate. In other words, the respective voltages stored across capacitor 80 and across capacitor 90 during a period of time "droop" together. Such droop in voltage is more pronounced at low sample rates (e.g., 1 MHz) but is effectively canceled out. This is achieved here by connecting the output of the buffer amplifier 84 via the lead 86 and the output of the buffer amplifier 94 via the lead 96 to respective differential inputs of the second (amplifier) section 52. This enables the ASP 14 to operate effectively over a wide range of sample rates of the pixel input signals at terminal 58. By way of example, the coupling capacitor 60 may have a value of 2000 pF and can be external to the remainder of the circuit of section 50. The coupling capacitor 60 and the switch 68 correspond to the capacitor "C1" and the clamp switch "1" shown in FIG. 5 on page 4 of the above-identified White, et al. article. The ASP 14 provided by the present invention combines "correlated double sampling" (CDS) noise reduction with differential noise and error cancellation, and a wide range of signal sample rates.

The second section 52 of the ASP 14 comprises a variable gain amplifier ("Av") 100 which has a first input terminal 102 connected to the lead 86, and has a second input terminal 104 connected to the lead 96. The amplifier 100 has an output terminal 108. The gain of the amplifier 100 is adjustable and is determined by an external voltage "V gain" applied to a terminal 110. The voltage "V gain" is applied at a suitable node (not explicitly shown) within the amplifier 100 via a lead 112. A "dark" level of the output signal of the amplifier 100 at the output terminal 108 is set by a voltage "V offset" at a terminal 114. This voltage "V offset" is applied via a lead 116 at a suitable point in the circuit (not explicitly shown here) of amplifier 100. The amplifier 100 differentially amplifies the respective signals applied to input terminals 102 and 104, and applies a suitably amplified single-ended output signal to the output terminal 108. The amplifier 100 comprises three main functional blocks. Though not shown here, these are: a differential voltage to differential current input stage, a Gilbert gain cell, and a differential current to single-ended voltage output driver. Circuits for each of these functional blocks are well known in the art. The amplifier 100, by way of example, can be substantially identical to one described in detail in an article by R. A. Blauschild entitled "An Open Loop Programmable Amplifier with Extended Frequency Range", *IEEE Journal of Solid-State Circuits,* Vol. SC-16, No. 6, December 1981, pages 626–633, which is incorporated herein by reference. A detailed schematic diagram of a complete amplifier circuit (implemented as an IC) is given in FIG. 10, page 631 of the Blauschild article. A gain-setting control voltage (corresponding to "V gain" of the "Av" amplifier 100 of the ASP 14) can be applied at the circuit node identified as "bias 6" in FIG. 10 of Blauschild, and a "zeroing" voltage ("V offset") applied at "bias 8". It is noted that by limiting the bandwidth (and hence noise) of the amplifier 100, the dynamic range of the ASP 14 at slow sample rates (e.g., 1 to 15 MHz) is substantially better than 10-bits.

The output terminal 108 of the amplifier 100 of the second section 52 is connected via a lead 120 to an input terminal 122 of the third section 54 which comprise a multiplex (MUX) unit 124, an inverting amplifier 126, both of which are well known in the art, and resistors 142, 150 and 158. The MUX 124 comprises a single pole double throw switch 128 which is actuated by a control signal "φ blank" as indicated by the dashed line 129. The switch 128 has a first terminal 130, a second terminal 132 and a common third terminal 134. The terminal 130 is connected to the input terminal 122 and the terminal 132 is connected to a second input terminal 136 to which a reference voltage "V blank" is applied. With the switch 128 in an "up" position as is shown, input signals at the terminal 122 are applied to the terminal 134 of the switch 128; with the switch 128 in a "down" position (not shown) the reference voltage "V blank" at the terminal 136 is applied to the terminal 134. Output signals from the MUX 124 are connected via a lead 140 from the terminal 134 through a resistor 142 to a negative (−) input terminal 144 of the amplifier 126. The amplifier 126 applies to an output lead 148 coupled thereto an output signal "V out" which is positive-going for a negative-going input at the terminal 144. Connected between the output lead 148 and the input terminal 144 of the amplifier 126 is a feedback resistor 150. The negative input terminal 144 is also connected via a resistor 152 to a first input terminal 154 to which a first positive-going image signal (indicated here as "+V green") may be applied, as will be explained hereinafter. A second input terminal and a resistor, indicated by the dashed lines, can be connected in parallel with the terminal 154 and resistor 152 to terminal 144. A second positive going image signal (not shown here) may be applied to the second terminal as will be explained hereinafter. The amplifier 126 has a positive (+) input terminal 156 which is connected to ground through the resistor 158. The resistors 142, 150, and 152 may be equal in ohmage, with each having twice the resistance of the resistor 158. It is noted that the output lead 148 of the third section 54 here corresponds to a respective one of the leads 40, 42, and 44 as shown in FIG. 1.

The fourth section 56 of the ASP 14 serves as a feedback servo loop for setting to a desired "zero" level the output image signals "V out" on the lead 148 from the third section 54 regardless of the gain setting of the second section 52. As will be explained in greater detail shortly, the "zero" level of the output image signals from each third section 54 (e.g., the dark level of the respective color-component signals being processed by each one of the ASP's 14A, 14B and 14C of FIG. 1) is the same regardless of the gain setting of each second section 52. The fourth section 56 comprises an operational amplifier (OAMP) 160, a switch 162, a capacitor 164 and a buffer amplifier 165. The OAMP 160 has a negative (−) input terminal 166 which is connected via a lead 167 to the output lead 148 of the third section 54. The OAMP 160 has a positive (+) input terminal 168 to which is applied a reference voltage "V clamp 2". The difference in voltage between the image signals ("V out") applied to the terminal 166 and the reference voltage at terminal 168 is amplified and outputted in proper polarity by the OAMP 160 to a lead 170 which is connected to a first terminal of the switch 162. This switch 162 (shown open) is actuated by a control signal "φ clamp 2" as indicated by the dashed line 172. A second terminal of switch 162 is coupled via a lead 174 to a first terminal of the capacitor 164 and to an input of the buffer amplifier 165. A second terminal of the capacitor 164 is coupled to ground. When the switch 162 is closed, the voltage on the lead 170 is applied via the lead 174 across the capacitor 164 and ground. The buffer amplifier 165 is connected via a lead 176 to the terminal 114 which thus receives a voltage, termed "V offset", proportional to that stored across the capacitor 164. The capacitor 164, by way of example, has a capacitance of 2000 pF and is externally provided. The capacitor 164 is made large enough so that from one cycle of opening of the switch 162 to the next cycle of switch opening the voltage "V offset" remains substantially constant. The voltage "V offset" resulting from the servo action of the fourth (feedback) section 56 automatically maintains, at a set value referenced to the voltage "V clamp 2", the direct current "zero" or dark level of the output image signals "V out" on the lead 148 regardless of the gain setting of the second section 52. It is of course understood that in the imaging system 10 of FIG. 1, the voltage "V clamp 2" is applied in common (along with "V clamp 1" and "V blank") to the ASP's 14A, 14B and 14C. Thus by placing the feedback (fourth) section after the variable gain amplifier (second) section in the ASP 14, white balancing of the color-components of the image signals does not interact with their "dark" level balance. A detailed description of "white balance" is given in the above-identified co-pending U.S. patent application, which description is explicitly incorporated by reference into the present patent application. The respective switches 68, 76, 78, 128 and 162 are readily implemented as JFET transistors or as diode bridges. The time-relations of the respective control signals "φ clamp 1", "φ sample G", "φ sample C", "φ sample Y", "φ blank", "φ clamp 2", and the G pixel image signals and the C, Y pixel image signals from the CCD unit 12 are described hereinafter. The novel architecture of each ASP 14 is such that the circuitry is readily implemented as a single integrated circuit using bipolar/JFET technology. Only two external elements, the capacitors 60 and 164, are required.

Figure 3:
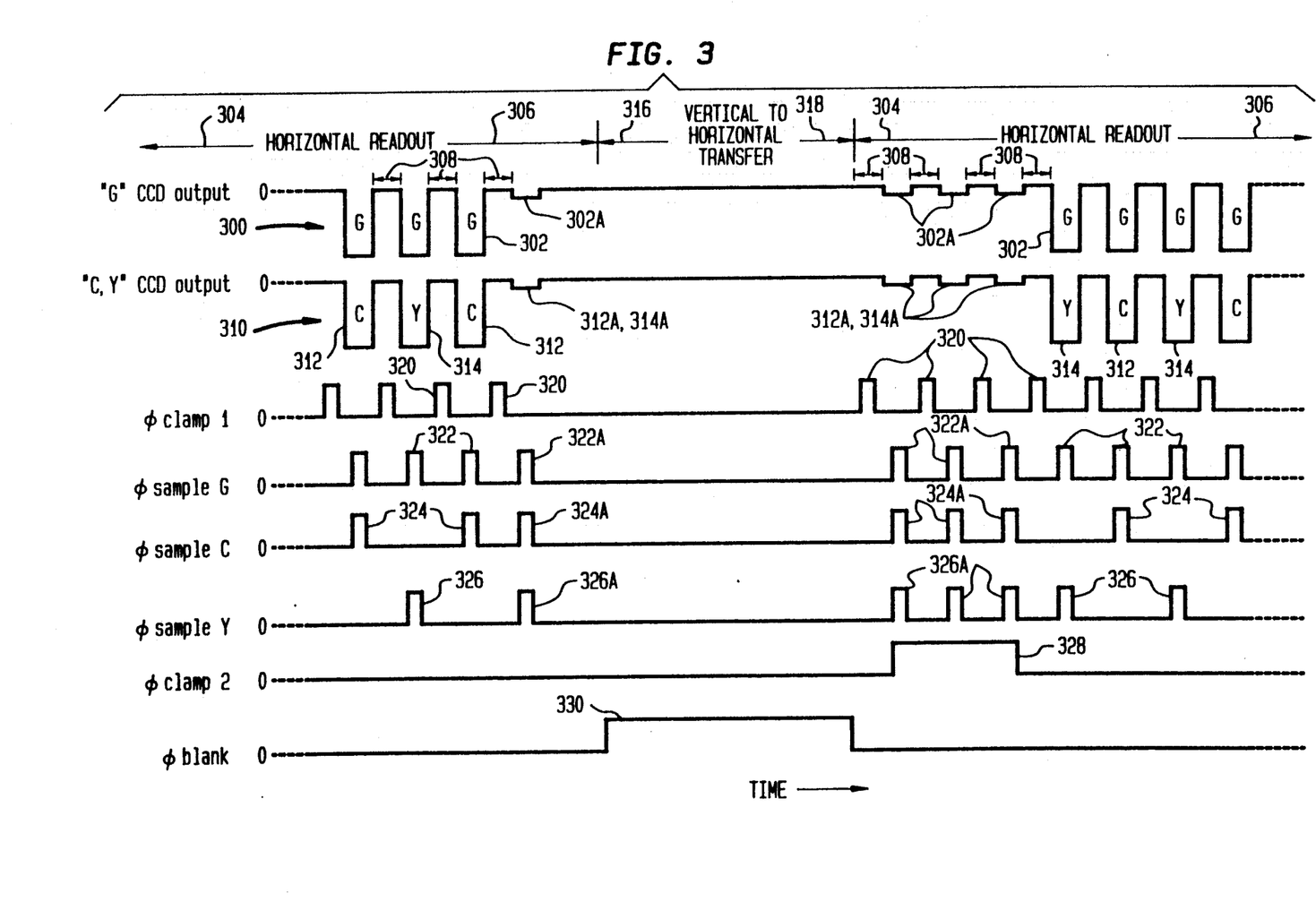
FIG. 3 is a timing diagram showing the time relationship between pixel image signals from a CCD unit of illustrated in FIG. 1 and various control signals (o) used in conjunction with the ASP's of FIGS. 1 and 2.

As was explained previously, when no light reaches the CCD unit 12 of FIG. 1, there is in fact a minimum "dark" ("min dark") signal level produced by the respective cells (e.g., the cells 20) of the CCD unit 12. This minimum dark voltage termed "V dark" is described in detail in the above-identified co-pending U.S. patent application, which description is explicitly incorporated by reference into the present patent application. Briefly stated, in order to avoid dark background variations in an image reproduced from the CCD unit 12, it is necessary to reference accurately to a "zero" or constant d.c. level the "V out" image signals from the ASP 14. This is accomplished by the fourth (feedback) section 56, as was previously described. But to obtain "white balance" of the respective color components of the R, G, and B output image signals on the leads 40, 42, and 44 as illustrated in FIG. 1 herein, it is necessary to equalize the respective maximum bright levels of these R, G and B signals. This is accomplished by separately adjusting the gains of the amplifier (second) sections 52 of the respective ASP's 14A, 14B, and 14C. A feedback loop such as that of the fifth (feedback) section 440 (FIG. 7) in the above-identified co-pending patent application, may be employed with the ASP's herein. Referring now to FIG. 3, there is shown a timing diagram (not to scale) illustrating the relative times and durations of the "G" CCD output signals, the "C, Y" CCD output signals, and the respective control signals "φ clamp 1", "φ sample G", "φ sample C", "φ sample Y", "φ clamp 2", and "φ blank". Time is indicated along the horizontal axis and relative voltage for the various signals (above or below a "0" value for each signal) along the vertical axis. The "G" CCD output is indicated at 300 and is shown as a series of negative-going G signal pulses 302 (arbitrarily of the same amplitude), along with "dark" level signal pulses 302A. These occur during an extended time of horizontal readout, as indicated by the arrows 304 and 306, of a line of pixels of the CCD unit 12 (i.e, the line of G pixels stored in the register 22 of FIG. 1. The short reset intervals between the G signals 302 are as indicated by the double ended arrows 308. The duration of the G signals 302 and the reset intervals 308 are shown as approximately equal and correspond to the "signal" and "reset" intervals in a CCD unit, as is well known in the art. The "C, Y" CCD output is indicated at 310 and is shown as a series of negative-going C pulses 312, and negative-going Y pulses 314 which alternate in time as indicated, along with "dark" level signal pulses 312A and 314A. In this example there are as many G pulses 302 as there are C pulses 312 and Y pulses 314 together. At the end of each interval of horizontal readout there is an interval, termed "vertical to horizontal transfer" and indicated by the arrows 316 and 318, during which the next lines of G and of C, Y image pixels within the CCD unit 12 are shifted into position (i.e., into registers 22 and 24) for another horizontal readout, and so on. During vertical to horizontal transfer unwanted switching transients may be present but they are "blanked" out of the output image signals "V out" produced by the ASP 14, as will be explained shortly.

The control signals "φ clamp 1" comprise a series of short duration pulses 320 each of which is approximately centered within a reset interval 308 of the "G" CCD output 300 and the "C, Y" CCD output 310. Each "φ clamp 1" pulse 320 closes the switch 68 within the first section 50 (FIG. 2) of the ASP 14 for a short time during which the reference voltage "V clamp 1" is applied to the capacitor 60. The "φ sample G" control signals are a series of short duration pulses 322 and 322A, each of which is approximately centered within the interval of a respective G signal pulse 302 and 302A of the "G" CCD output 300. It is noted that the "φ sample G" pulses 322 occur between the "φ clamp 1" pulses 320, and that "φ sample G" pulses 322A occur during respective ones of the "dark" level pulses 302A. The "φ sample C" control signals are a series of short duration pulses 324 and 324A, each of which is centered approximately within the interval of a respective C pulse 312, and dark level pulses 312A and 314A of the "C, Y" CCD output 310. A "φ sample C" pulse at 324A occurs at the same time as a respective pulse 322A. Similarly, the "φ sample Y" control signals are a series of short pulses 326 and 326A each of which is centered approximately within the interval of a respective Y signal pulse 314, and a dark level pulse 312A, 314A. Each "φ sample Y" pulse 326A occurs at the same time as the pulses 322A and 324A. Respective ones of the "φ sample G", "φ sample C" and "φ sample Y" control signals are applied to the ASP's 14A, 14B and 14C see (FIG. 1). The "φ sample G" control signals actuate the switches 76 and 78 (see also FIG. 2) of the ASP 14A to sample the −G pixel image signals. The "φ sample C" control signals actuate the switches 76 and 78 of the ASP 14B to sample only the −C pixel image signals (and not the −Y) applied to it. And the "φ sample Y" control signals actuate the switches 76 and 78 of the ASP 14C to sample only the −Y pixel image signals (and not the −C) applied to it. The G, C, and Y, control signal pulses 322A, 324A and 326A actuate the respective switches 76 and 78 of the three ASP's 14A, 14B, and 14C at the same time to sample dark pixel image signals 302A, 312A and 314A, as was explained previously. The switches 76 and 78 of each ASP 14A, 14B, and 14C are closed when the switch 68 is open, and are open when the switch 68 is closed.

The "φ clamp 2" control signal is a pulse 328 which occurs after vertical to horizontal transfer and lasts for an interval during which three of the pulses 322A, 324A, and 326A occur as indicated. The "φ clamp 2" pulse 328 controls the switch 162 and ends before the next G signal pulse 302 and Y signal pulse 314 occur. The "φ blank" control signal is a pulse 330 which begins just after the vertical to horizontal transfer interval begins and ends shortly before this interval ends. The pulse 330, when on (high), moves the switch 128 in the MUX 124 down to the contact 132. This inserts the reference voltage "V blank" into the output signal "V out" on the lead 148. The reference voltage "V blank" applied to the terminal 136 of the MUX 124 can be adjusted to insert during the duration of the "φ blank" control signal pulse 330, a zero volt level (free of noise) within the vertical to horizontal transfer interval, as indicated here. Alternatively, the voltage "V blank" can be adjusted to insert a "step" voltage level different from the zero one shown here. Circuits for generating the respective control signals are well known in the art. The respective reference voltages are temperature compensated (along with supply voltages not shown) so that the operation of the ASP 14 is stable over a range of temperatures.

The ASP 14B of the imaging system 10 of FIG. 1 processes the −C pixel image signals (and not the −Y) applied to it via the lead 32. Sections 50 and 52 of the ASP 14B process a −C color-component signal, and section 54 combines in proper polarity and amplitude the −C signal with the +G signal applied to the terminal 154 of the ASP 14B via the lead 40 from the ASP 14A to obtain at the output lead 42 of the ASP 14B the +B color component output image signal. In similar fashion, the ASP 14C processes only a −Y color-component signal (and not the −C), combines the −Y signal with the +G signal (applied to the terminal 154 of the ASP 14C) and outputs to the lead 44 the +R color-component output image signal. The image system 10 simply and directly translates color-component pixel image signals in a first sequence of colors (e.g., C, Y and G) into color-component output image signals in a second sequence of colors (e.g., R, G, and B). These color-component output image signals have white balance and uniform dark "zero" level.

Figure 4:
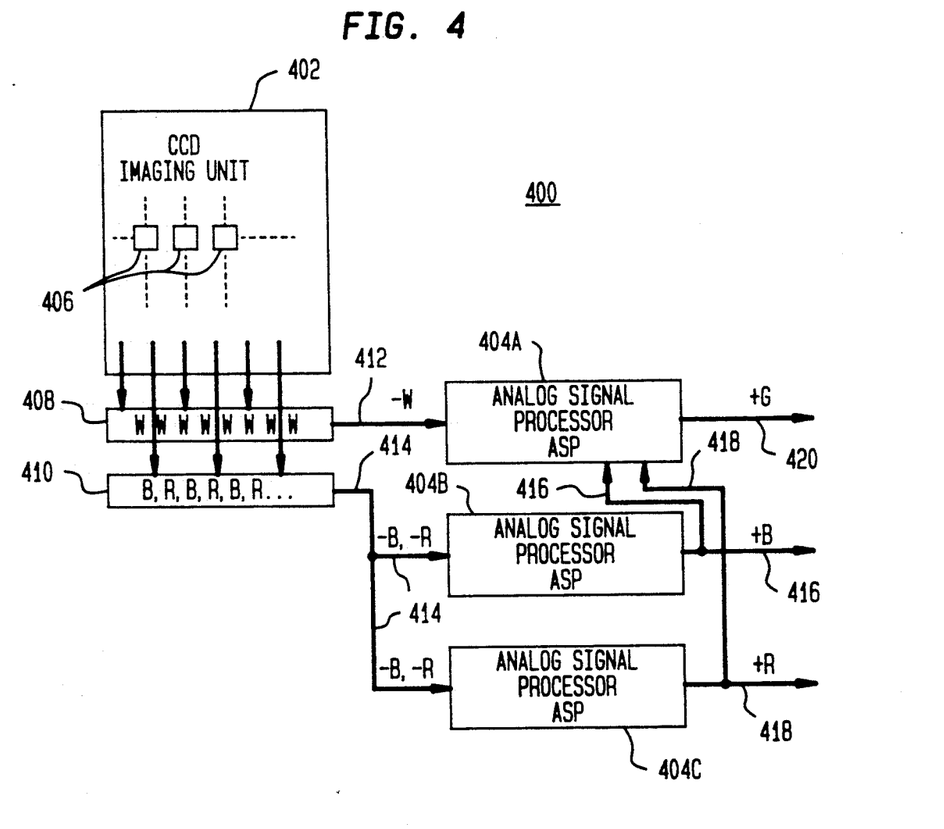
FIG. 4 is a schematic block diagram of another electronic imaging system in accordance with the present invention.

Referring now to FIG. 4, there is shown an electronic color imaging system 400 in accordance with the present invention. The imaging system 400 comprises a CCD imaging unit 402, a plurality of substantially identical analog signal processors (ASP's) 404A, 404B, and 404C, a first horizontal signal register 408 and a second horizontal signal register 410. The CCD unit 402 is similar to the CCD unit 12 of FIG. 1 but provides a different sequence of color-component pixel image signals. Certain cells 406 of the CCD unit 402 are respectively covered by no masks at all to produce "white" (W) color-component signals. These W cells of the CCD unit 402 have maximum efficiency since they are not covered by any light filter. Other cells 406 are covered by "blue" (B) masks and still other cells by "red" (R) masks to produce B and R color-component signals. A horizontal row of W cell signals are transferred during "vertical to horizontal transfer" to the first horizontal signal register 408 where they are temporarily stored as a series of W pixel image signals. Similarly, a horizontal row of alternating B and R signals are transferred to the second horizontal signal register 410. The R and B signals are together equal in number to the W signals. The W signals in the register 408 are outputted as −W pixel image signals via a lead 412 to an input of the ASP 404A. Similarly, the B, R, B, R etc. signals in the register 410 are outputted as −B, −R pixel image signals via the lead 414 to an input of the ASP 404B and the ASP 404C. The ASP's 404A, 404B and 404C are closely similar to the ASP's 14A, 14B and 14C previously described and operate in substantially the same way.

The ASP 404B processes the −B (and not the −R) signals applied to it and provides +B color-component output signals to a lead 416. Similarly, the ASP 404C provides only +R color-component output signals to a lead 418. The leads 416 and 418 are respectively connected to a first terminal 154 and to a second such terminal shown in dashed lines (see FIG. 2) of ASP 404A. Thus +B and +R color-component signals are applied to the third section 54 of the ASP 404A. The B and R signals are combined in the ASP 404A in proper polarity and phase with the W signals to produce +G color-component output signals on a lead 420. The +G, +B, and +R signals on the respective leads 420, 416, and 418 are white balanced and have uniform dark zero level, as was previously explained. Those skilled in the art will easily understand the application of the timing diagram of FIG. 3 and the various signals illustrated therein to the operation of the imaging system 400.

It is to be understood that the imaging systems and the ASP's described herein are illustrative of the general principles of the invention. Modifications may readily be devised by those skilled in the art without departing from the spirit and scope of the invention. For example, the imaging system of the present invention is not limited to a particular CCD imaging unit, or to three color components, or to the particular colors described. Moreover, an ASP is not limited to specific circuit values, or to a particular input signal sampling rate, or to the sections illustrated. An ASP is not restricted to implementation as an IC, or to manufacture by a particular process technology.

What is claimed is:

1. An electronic color image system in which a photo-imaging unit provides a plurality of color-component pixel image signals in a first color component group, the electronic color image system outputting color-image output signals in a second color component group, the electronic color image system comprising:
   a plurality of analog signal processors (ASP's) which are substantially identical and which are operated in unison, the ASP's being connected to receive a respective one of the color-component pixel image signals in the first color component group and for processing them into a like plurality of amplified color-component output image signals in the second color component group to be combined into a full color image with white balance and uniform dark background level; and
   a first ASP of the plurality being connected to apply a first color-component output image signal from itself to a second ASP, the second ASP combining the first color component output image signal with a different color-component image signal being processed in the second ASP and outputting a second color-component output image signal, such that color-component pixel image signals in the first color component group are directly outputted by the ASP's as color-component output image signals in the second color component group.

2. The electronic color image system of claim 1 wherein the photo-imaging unit is a CCD unit which provides color-component pixel image signals in the first color component group which are cyan, yellow and green, such that the CCD unit has improved efficiency and lower noise than a similar CCD unit providing a different sequence of colors.

3. The electronic color image system of claim 2 wherein a first ASP applies green output image signals to a second ASP which is connected to receive cyan pixel image signals and to output blue output image signals, and the first ASP applies green output image signals to a third ASP which is connected to receive yellow pixel image signals and to output red output image signals, such that the output image signals are directly compatible with television standards.

4. The electronic color image system of claim 1 wherein the photo-imaging unit is a CCD unit which provides color-component pixel image signals in the first color component group which are white, blue and red, such that the CCD unit has improved efficiency and lower noise than a similar CCD unit providing a different sequence of colors.

5. The electronic color image system of claim 4 wherein a second ASP applies blue output image signals to a first ASP, and a third ASP applies red output image signals to the first ASP, the first ASP being connected to receive white pixel image signals and to output green output image signals, such that the output image signals are directly compatible with television standards.

6. An analog signal processor (ASP for use with a CCD imaging unit in an electronic image system, the ASP comprising:
   input means for receiving pixel image signals from the CCD unit and for clamping, sampling and holding sample values of the pixel signals for processing within the ASP;
   amplifier means having:
   a first input for receiving a first component of the pixel image signals comprising sampled values of a pixel signal level;
   a second input for receiving a second component of the pixel image signals comprising a pixel reset level;
   means for combining the first and second components to obtain desired output image signals;
   the amplifier means providing an overall gain of the desired output image signals which is adjustable over a range and having a feedback signal input for setting a d.c. level of the output image signals at a desired dark zero value; and
   feedback means for receiving image signals and for feeding back to the feedback input of the amplifier means a compensating signal for setting the dark zero value of the output image signals independent of the gain setting of the amplifier means.

7. The ASP of claim 6 in further combination with a substantially identical second ASP, the first ASP being connected to receive a first color-component pixel image signal from the CCD unit, the second ASP being connected to receive a second color-component pixel image signal from the CCD unit, the respective gains of the ASP's being adjusted to equalize the levels of the respective output image signals from the ASP's, the output image signals of the first ASP being connected to the second input of the amplifier means of the second ASP.

8. An analog signal processor (ASP) comprising:
   a first section for receiving pixel image signals of a first color from a high impedance CCD unit, the first section having circuit means for correlated double sampling of the pixel image signals, and for differentially sampling and holding values of the first color pixel signals and of a first reference voltage as respective stored analog voltages;
   a second section for receiving the stored analog voltages, the second section having amplifier means for differentially combining the stored analog voltages and for providing an output signal of the first color, the second section having an adjustable gain control and having feedback input for adjusting a d.c. zero dark level of the output signal;
   a third section having a first input for receiving the first color signal from the second section and having a second input for receiving a second color signal and for combining the first and second color signals to provide an output signal of a third color; and
   a fourth section for receiving an image signal and for applying a compensating signal to the feedback input of the second section, the fourth section having feedback means for referencing the zero level of the image signal against a second reference voltage and for adjusting the compensating signal by servo action to maintain a desired balance between the second reference voltage and the zero dark level, such that the pixel image signals can be accurately sampled over a wide range of sample rates, the gain of the second section is adjustable and the zero dark level of the third color output signal is determined independently of the gain, and the four sections of the ASP are readily implemented as a single integrated circuit.

9. The ASP of claim 8 wherein the first section comprises:

a series coupling capacitor having a first terminal which is connected to receive first color pixel signals from the CCD unit;

a clamping switch for momentarily connecting a second terminal of the coupling capacitor to a voltage terminal at which the first reference voltage is applied; first and second storage capacitors;

first and second sample switches which are operated together, the first sample switch being connected to apply a momentary sample of the pixel signals received from the second terminal of the coupling capacitor across the first storage capacitor, and the second sample switch being connected to momentarily apply the first reference voltage at the voltage terminal across the second storage capacitor;

circuit means for applying the respective analog voltages stored on the first and second storage capacitors to the second section;

the clamping switch being adapted to be momentarily closed when the first and second sample switches are open and to be open when the first and second sample switches are closed; and the first and second storage capacitors being essentially of the same capacitance such that a dynamic range of better than 8-bits is obtained at high sample rates and better than 10-bits at a slow sample rate.

10. The ASP of claim 8 wherein the second section comprises a differential voltage to differential current input stage, a Gilbert gain cell, and a differential current to single-ended voltage output driver.

11. The ASP of claim 8 wherein the third section comprises:

a multiplex unit and an inverter amplifier;

the multiplex unit having a first input terminal for receiving the first color output signals from the second section, and having a second terminal to which is applied a third reference voltage, the multiplex unit having an output for applying the first color output signals to the inverter amplifier during horizontal readout of the pixel signals from the CCD unit, and for applying the third reference voltage to the inverter amplifier during the vertical to horizontal line transfer in the CCD unit: and the inverter amplifier having a first input connected to the output of the multiplex unit, and having a second input for receiving the second color signal, the inverter amplifier being adapted to combine in proper polarity and amplitude the first and second color signals to provide an output signal of the third color.

12. The ASP of claim 8 wherein the fourth section comprises:

an operational amplifier having an output;

a storage capacitor and a switch connected between the output and the storage capacitor, the operational amplifier having an input connected to receive an output signal from the third section, and having a second input connected to the second reference voltage; and the operational amplifier being adapted to generate at an output thereof an offset voltage which is proportional to the compensating feedback signal and which is stored in the storage capacitor and is periodically refreshed by a momentary closing of the switch.

13. The ASP of claim 8 in further combination with a plurality of like ASP's, each ASP being connected to receive a respective color-component pixel image signal of a first sequence of colors from the CCD unit, the gain of each ASP being set so that the maximum bright amplitude of each color-component output signal is equalized for white balance, the respective ASP's each being supplied with the first and second reference voltages and being operated in unison, the ASP's being interconnected to output a respective color-component output image signal of a second sequence of colors.

* * * * *